United States Patent [19]
Klamm

[11] Patent Number: 6,135,136
[45] Date of Patent: Oct. 24, 2000

[54] SYSTEM FOR DRAINING AND RECOVERING COOLANT FROM A MOTOR VEHICLE COOLING SYSTEM

[75] Inventor: Thomas L. Klamm, Racine, Wis.

[73] Assignee: UView Ultraviolent Systems, Inc., Mississauga, Canada

[21] Appl. No.: 08/947,522

[22] Filed: Oct. 2, 1997

[51] Int. Cl.[7] .................................................. F01P 11/02
[52] U.S. Cl. ........................... 137/205; 137/318; 141/65; 141/98; 141/330; 123/41.14
[58] Field of Search .................... 137/205, 318; 141/65, 98, 330; 123/41.14, 41.15; 181/255, 200; 417/182

[56] References Cited

U.S. PATENT DOCUMENTS

| | | | |
|---|---|---|---|
| 1,661,608 | 3/1928 | Grauel | 137/205 |
| 2,114,583 | 4/1938 | Adams | 137/318 X |
| 2,359,162 | 9/1944 | Sherbondy | 417/182 |
| 2,740,420 | 4/1956 | Hanks | 137/205 |
| 3,765,505 | 10/1973 | Pendleton | 181/200 |
| 4,016,896 | 4/1977 | Oikarinen | 137/205 |
| 4,275,731 | 6/1981 | Nichols | 137/205 X |
| 4,290,446 | 9/1981 | Seiler | 137/205 X |
| 4,782,689 | 11/1988 | DeRome | 73/49.2 |
| 4,888,980 | 12/1989 | DeRome | 73/49.2 |
| 5,099,804 | 3/1992 | Creeron | 137/318 X |
| 5,117,876 | 6/1992 | Kuntz | 141/383 X |
| 5,306,430 | 4/1994 | Dixon et al. | 123/41.14 X |
| 5,427,505 | 6/1995 | Payne | 137/205 X |
| 5,575,307 | 11/1996 | Martinitz et al. | 137/205 |
| 5,615,716 | 4/1997 | Akazawa | 141/65 X |
| 5,673,733 | 10/1997 | Turcotte et al. | 141/65 |

OTHER PUBLICATIONS

D. Cappert, "Let It Bleed", *Super Automotive Service*, pp. 22–25, Oct. 1989.

E. Carpenter, "Vac–U–Fill Coolant Filler", *Circle Track*, pp. 132–133, Feb. 1997.

*Primary Examiner*—John Rivell
*Attorney, Agent, or Firm*—Bell, Boyd & Lloyd LLC

[57] ABSTRACT

An apparatus for recovering coolant from a motor vehicle includes an inlet tube with a sharply pointed end for penetrating a wall of a hose of the vehicle cooling system. The inlet tube is connected to an inlet of a closed container. An outlet of the closed container is coupled to a suction port of a venturi that also has a fluid inlet for attachment to a source of a pressurized fluid, and a fluid outlet. The flow of fluid from the fluid inlet to the fluid outlet creates a suction at the suction port which draws coolant from the cooling system of a vehicle into the closed container. A muffler is provided at output from the venturi to reduce noise produced by fluid flowing form that output. Specific structures for the venturi and the muffler are disclosed.

26 Claims, 3 Drawing Sheets

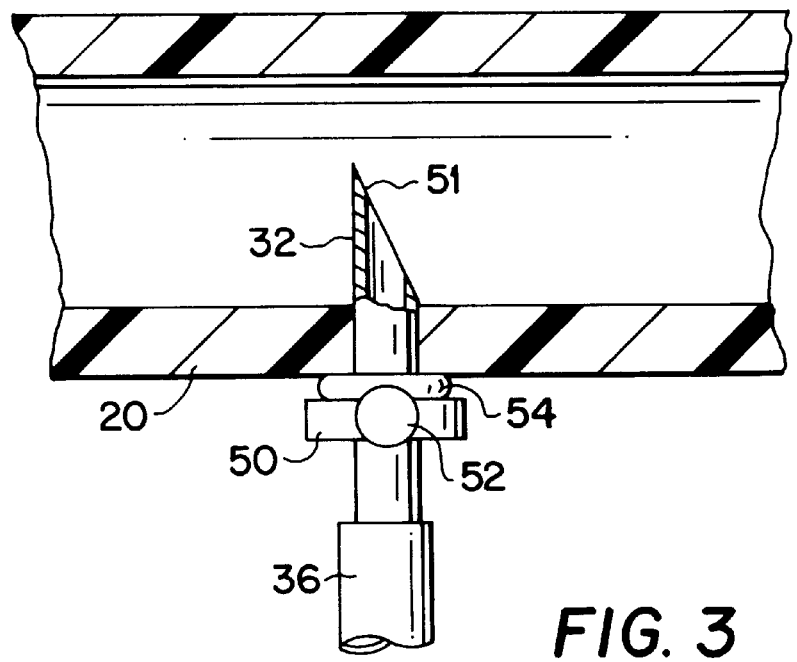
*FIG. 3*
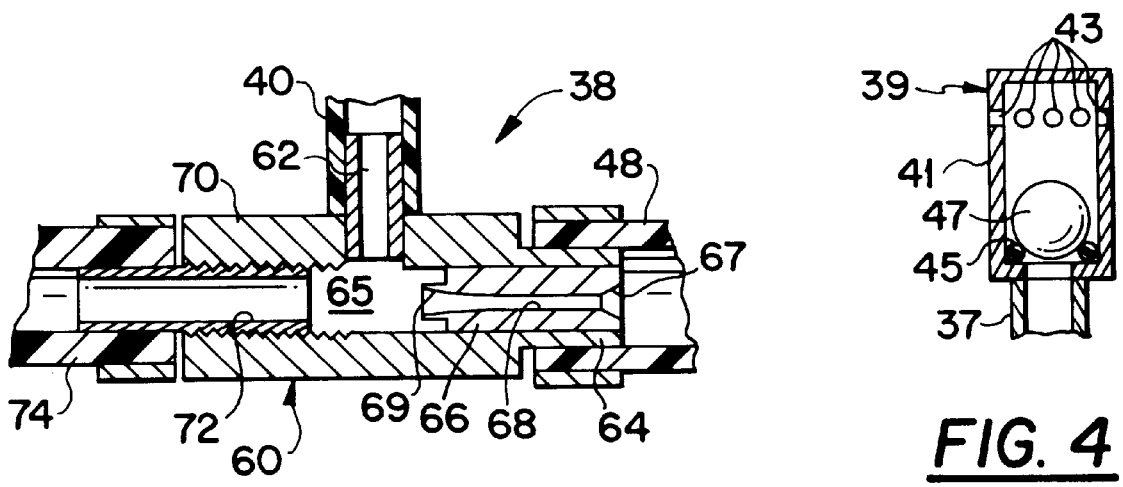
*FIG. 5*   *FIG. 4*
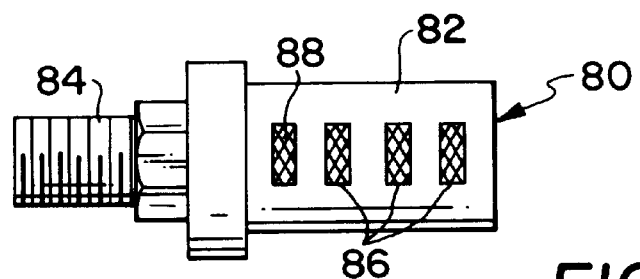
*FIG. 6*

SYSTEM FOR DRAINING AND RECOVERING COOLANT FROM A MOTOR VEHICLE COOLING SYSTEM

BACKGROUND OF THE INVENTION

The present invention relates to systems for draining coolant from a motor vehicle and recovering the drained coolant for environmentally conscious disposal or recycling.

Periodically, it is necessary to replace the coolant in the cooling system for a motor vehicle engine. For this purpose, a stopcock is provided at the bottom of the radiator. In order to drain the system, the stopcock is opened and a radiator cap at the top of the engine is removed to allow air to enter the system braking a vacuum which would otherwise prevent the flow of coolant through the lower stopcock. For faster draining the technician often cut the lower radiator hose, when that hose was to be replaced as part of the cooling system maintenance.

Many years ago a service technician draining the radiator simply allowed the coolant to flow to a floor drain in the garage from which it entered the municipal sewer system. With increased concerns about damaging the environment, such dumping of coolant chemicals, which often contain heavy metals, into a sewer system has been prohibited. Now the service technician must place a pan beneath the stopcock in which to catch the coolant draining from the engine. The technician must then pour the coolant into a suitable container for proper disposal according to environmental protection regulations.

The coolant drains relatively slowly from the cooling system and in fact may not drain from all of the locations within the engine block. It is therefore desirable to provide a faster technique for removing the coolant from the cooling system of a motor vehicle and recovering the drained coolant for proper disposal.

In addition to having to drain the coolant to replace it during routine maintenance of the automobile, salvage yards are now also required to recover the coolant from junked motor vehicles so that the proper disposal of the coolant may be carried out. Heretofore personnel at vehicle salvage yards simply cut the lower radiator hose from the motor vehicle in order to provide a very large opening in the coolant system through which the coolant could flow. In this situation, the coolant flowed either directly onto the ground of the salvage yard or into a floor drain where it entered the sewer system. Both of these disposal techniques are now prohibited by environmental regulations. It is also important in motor vehicle recycling that the fluids be drained from the engine as rapidly as possible and allowing gravity to drain the coolant through the stopcock may be too slow to ensure that the personnel did not violate environmental regulations by continuing to sever the lower radiator hose allowing the coolant to drain onto the ground of the salvage yard.

SUMMARY OF THE INVENTION

The general object of the present invention is to provide a system for rapidly draining coolant from a motor vehicle and recovering the coolant for proper disposal.

Another object is to provide a motor vehicle coolant recovery system which requires a minimal amount of additional equipment.

A further object of the present invention is to provide a system for rapidly draining coolant from a motor vehicle which utilizes a standard source of compressed air that is available already at most motor vehicle service facilities.

These and other objectives are satisfied by an apparatus which includes an inlet tube for insertion through a wall of a hose of the cooling system. In the preferred embodiment of the invention, the inlet tube has an end that is tapered at an acute angle with respect to the tube's longitudinal axis thereby forming a sharply pointed end to penetrate the hose. In that embodiment a resilient annular member extends around the inlet tube to provide a fluid tight seal with the hose, and a ring is releasably attached about the inlet tube to adjustably limit the amount that the inlet tube may penetrate into the hose.

The apparatus also includes a closed container that has an inlet to which the inlet tube is connected, and an outlet. A venturi has a fluid inlet for attachment to a source of a pressurized fluid (such as air), a fluid outlet and a suction port connected to the outlet of the closed container. The venturi is designed so that the flow of fluid from the fluid inlet to the fluid outlet creates a suction at the suction port which draws coolant from the vehicle's cooling system into the closed container.

Preferably a muffler is coupled to the fluid outlet of the venturi to deaden noise made by the fluid escaping from the apparatus.

BRIEF DESCRIPTION OF THE DRAWINGS

FIG. 3 is a cross sectional view of a portion of the recovery system which pierces a radiator hose on the motor vehicle;

FIG. 4 is a cross section through a check valve of the engine coolant recovery system;

FIG. 5 is a cross sectional view of a venturi device for creating a pressure differential which draws coolant from the motor vehicle;

FIG. 6 is an isometric view of a muffler used in the engine coolant recovery system.

DETAILED DESCRIPTION OF THE INVENTION

Figure 1:
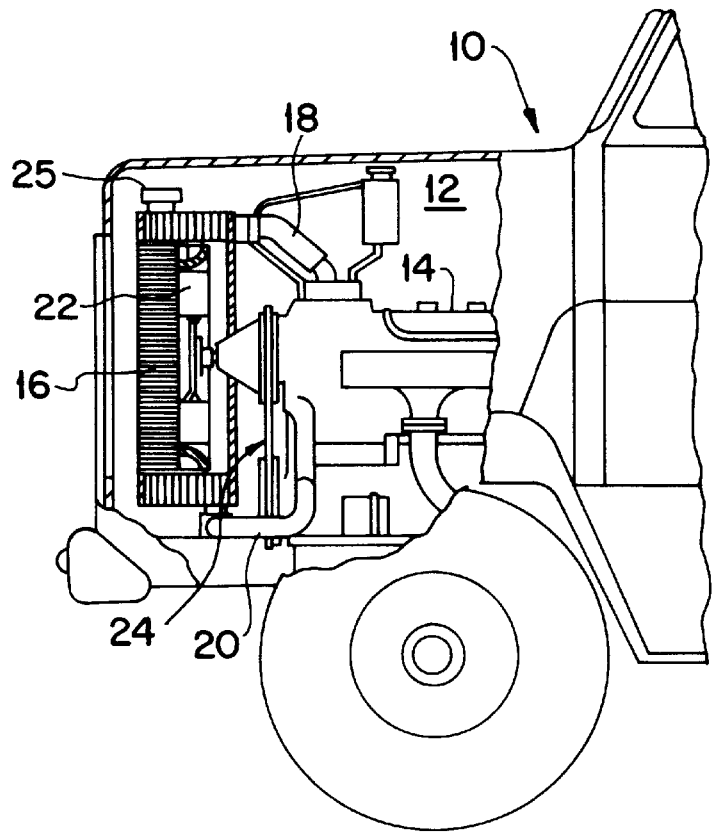
FIG. 1 is a partially cut-away view of a motor vehicle showing the interior of the engine compartment.

With initial reference to FIG. 1, a motor vehicle 10 has an engine compartment 12 that houses an engine 14. The engine is connected to a conventional cooling system which comprises a radiator 16 in front of the engine 14 and connected thereto by an upper radiator hose 18 and a lower radiator hose 20. A fan 22 at the front of the engine is driven by a pulley and belt arrangement 24 thereby forcing air through the radiator 16. The radiator 16 contains a conventional coolant liquid made up of a mixture of water and additive, such as propylene glycol. Periodic maintenance requires that the coolant be drained from the motor vehicle and replaced. Often the upper and lower radiator hoses 18 and 20 also are replaced at the same time.

Figure 2:
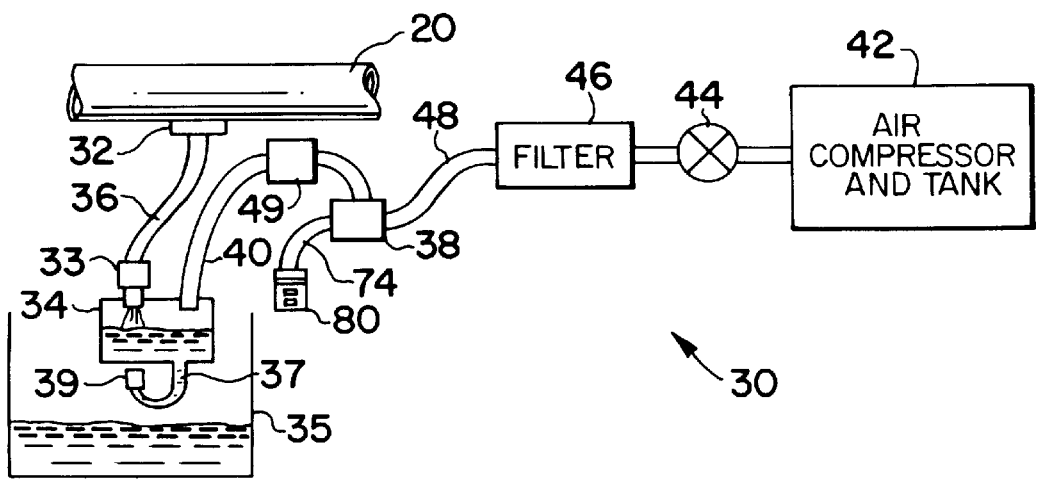
FIG. 2 is a diagram of the present engine coolant recovery system.

FIG. 2 depicts the present system for draining and recovering the coolant from the motor vehicle. This particular system is utilized when the lower radiator hose 20 is to be replaced or when the motor vehicle is being processed in a salvage yard. The coolant recovery system 30 comprises an inlet tube 32 which is inserted through the wall of radiator hose 20 and is connected to a sealed vacuum chamber 34 by a hose 36. An filter 33 removes any heavy metals that may be present in the coolant.

With reference to FIG. 3, the inlet tube 32 has an exposed end 51 which is cut at an acute angle with respect to the longitudinal axis of the tube thereby creating a pointed end which is able to pierce the wall of the rubber radiator hose. A resilient washer 54, such as a O-ring, extends around the inlet tube 32 and is compressed against the exterior wall of the lower radiator hose 20 by a metal spacer ring 50. The resilient washer 54 thus provides a fluid tight seal between the inlet tube 32 and the lower radiator hose 20. The metal spacer ring 50 can be slid into different positions along the length of the inlet tube and then fastened in place by a thumb screw 52 that is threaded through an aperture in the spacer ring 50 until contacting the inlet tube 32. The position of the spacer ring 50 determines the depth to which the inlet tube 32 is able to penetrate the lower radiator hose 20. Ideally, the inlet tube 32 should penetrate far enough so that its opening in the angled end 51 is just fully exposed to the interior of the lower radiator hose 20, thereby allowing a maximum amount of coolant to be withdrawn from the hose. The penetration depth of the inlet tube 32 is varied to accommodate radiator hoses of different thicknesses and diameters so that the inlet tube tip does not strike the opposite side of the radiator hose 20.

Returning to FIG. 2, coolant from the lower radiator hose 20 flows into the vacuum chamber 34 which is within a larger open reservoir 35, such as a standard 55 gallon drum for example. A U-shaped drain tube 37 extends from the bottom of the vacuum chamber 34 and terminates within the reservoir 35 at a drain check valve 39. The drain check valve 39 is shown in detail in FIG. 4 and comprises a basket 41 attached to the drain tube 37. The basket 41 has a plurality of apertures 43 through which the coolant escapes into the reservoir 35. An O-ring 45 in located within the basket 41 and extends around the opening into the drain tube 37. A ball 47 also is within the basket 41 and is held against the O-ring by the lower pressure in the vacuum chamber 34. Thus the ball 47 closes the opening to the drain tube 37 so that air from the open reservoir 35 can not enter the vacuum chamber 34.

The coolant is drawn from the lower radiator hose 20 into the vacuum chamber 34 due to suction produced by a venturi assembly 38 in FIG. 2. Specifically a suction hose 40 with suction check valve 49 extends from the vacuum chamber 34 to the venturi assembly 38. Details of the venturi assembly 38 are illustrated in FIG. 5 and comprise a T-shaped body 60 with a center suction port fitting 62 coupled to the suction hose 40 from the vacuum chamber 34. An inlet 64 of the body 60 has an internal sleeve 66 with a relatively small passage 68 therethrough. The outer end of the passage 68 has a flaired opening 67 and the inner end has a very slightly flaired opening 69. The inlet 64 is connected to a hose 48 through which compressed air flows into the venturi assembly 38. Although the venturi assembly is shown with separate components for the body 60, sleeve 66 and suction port fitting 62, those components could be integrated into a single piece body. The outlet 70 of the body 60 has a tuning tube 72 threaded therein so that the depth to which the tuning tube extends into the body 60 can be adjusted to vary the suction developed at the center fitting 62 as will be described. The tuning tube 72 is connected to an exhaust hose 74.

The exhaust hose 74 terminates at a muffler 80 which reduces sound produced by the exhaust air from the venturi assembly 38. The muffler 80, shown in FIG. 6, has a tubular body 82 with a threaded portion 84 for attachment to a coupling on the exhaust hose. A plurality of rectangular apertures 86 are spaced around the body 82 to allow air from the exhaust hose 74 to escape. A screen 88 within the body prevents sizeable particles from passing through the apertures 86.

Referring once more to FIG. 2, the inlet 64 of the venturi assembly 38 is supplied with compressed air from a source 42, such as an air compressor and tank assembly commonly found in most motor vehicle service facilities for powering different tools. Although compressed air is used in the preferred embodiment, because it is readily available at most vehicle repair facilities, sources of other pressurized gases and liquids also could be used to create a partial vacuum at the venturi assembly 38. An outlet of compressed air source 42 is connected through a control valve 44 and an air filter 46 that removes particles from the air flow which could adversely affect the operation of the venturi assembly 38. A hose 48 couples the filter 46 to the inlet 64 of the venturi assembly 38.

One skilled in the art will appreciate that the present inventive concept also may be carried out by replacing the venturi assembly 38, muffler 80 and components 42–48 that act as a source of compressed air, with a pump that creates a partial vacuum in the sealed vacuum chamber 34.

To drain the coolant from a vehicle, a technician opens the radiator cap 25 and inserts the inlet tube 32 through the wall of the lower radiator hose 20 until its resilient washer 54 is sealed against the hose. Then the technician opens the control valve 44 so that compressed air from source 42 flows through the venturi assembly 38. Because the internal sleeve 66 provides a restricted passage 68, the speed of the air flow increases going through the body 60 of the venturi assembly 38. This creates a pressure in the internal venturi chamber 65 that is below atmospheric pressure, thereby creating a back draft at the suction port fitting 62. This pressure differential draws air from the vacuum chamber 34 into the internal venturi chamber 65, thereby creating a partial vacuum in that chamber which draws coolant from the lower radiator hose 20. The magnitude of the back draft and thus the drawing of coolant can be tuned to an optimum level by varying the depth to which the tuning tube 72 is inserted into the venturi body 60.

The flow of coolant into the vacuum chamber 34 continues until fluid level reaches the open end of the suction hose 40, which causes the suction check valve 49 to close terminating the suction provided by the venturi assembly 38. With the suction removed, the drain check valve opens under the force of the coolant in the drain tube 37 thereby allowing the coolant to flow into the reservoir 35. The coolant drains into the reservoir until its level within the vacuum chamber 34 drops below the open end of the suction hose 40. At that time the suction check valve 49 opens again applying suction again to the vacuum chamber which causes the drain check valve 39 to close. This process repeats until all the coolant has been extracted from the radiator hose 20 at which point only air flows into the vacuum chamber 34.

The partial vacuum provided by the venturi assembly 38 removes the coolant from the engine cooling system at a faster rate than previous techniques that relied solely on gravity flow. Furthermore, the vacuum chamber 34 and reservoir 35 do not have to be lower than the radiator hose 20 to properly drain coolant from the engine cooling system. When the reservoir 35 becomes filled with coolant after repeated use, it is sealed and sent to a coolant disposal or recycling facility.

Figure 7:
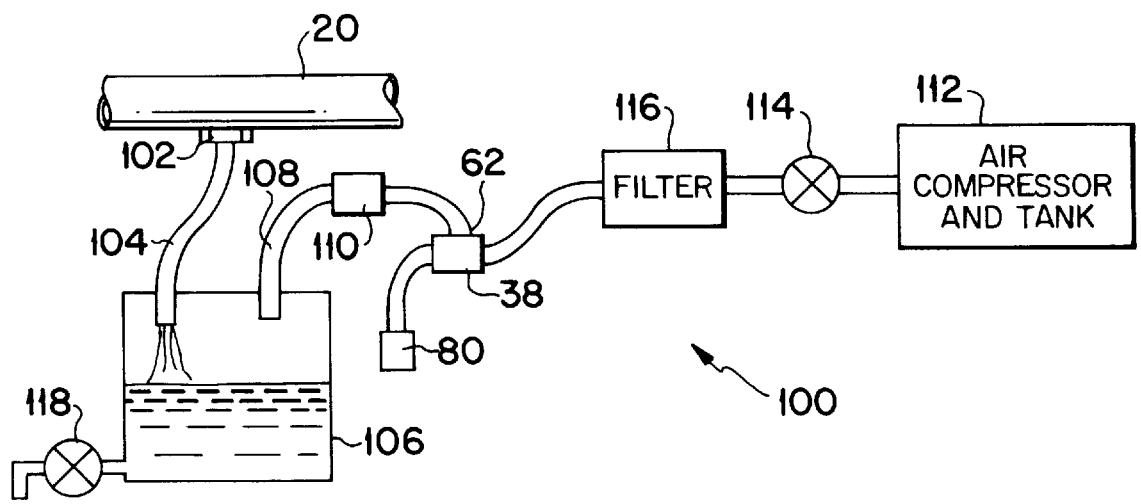
FIG. 7 is a diagram of another embodiment of an engine coolant recovery system according to the present invention.

With reference to FIG. 7, an alternative version of the coolant recovery system 100 comprises an inlet tube 102 which is inserted through the wall of the lower radiator hose 20 and is connected by a hose 104 directly to a sealed vacuum chamber 106. The vacuum chamber 106 has an exhaust outlet 108 that is coupled via a check valve 110 to the suction port fitting 62 of the venturi assembly 38 shown in FIG. 4. Referring still to FIG. 7, the inlet of the venturi assembly 38 is supplied with compressed air from a source 112 vias a control valve 114 and a filter 116. The outlet of the venturi assembly 38 is connected to a muffler 80 as shown in FIG. 5.

The coolant recovery system 100 functions is a similar manner to the previously described system 30. Compressed air still is sent from source 112 through the venturi assembly creating a back draft at the suction port fitting 62 thereby drawing air from the sealed reservoir 106. This action creates a partial vacuum in the closed vacuum chamber 106 which draws coolant from the radiator hose 20. Should the level of coolant in vacuum chamber 106 rise to the opening of the exhaust outlet 108, a vacuum will be created in the exhaust outlet which causes the check valve 110 to close thereby preventing coolant to flow to the venturi assembly 38 and out the muffler 80.

When the vacuum chamber 106 is full, the coolant can be removed into a suitable container through drain valve 118.

What is claimed is:

1. An apparatus for draining coolant from a cooling system of a vehicle, said apparatus comprising:

an inlet tube with a sharply pointed end for penetrating a wall of a hose of the cooling system;

a closed container having an inlet to which the inlet tube is connected, and having an outlet;

a mechanism coupled to the outlet to create a pressure in the closed container that is less than a pressure within the cooling system thereby drawing the coolant from the cooling system into the closed container; and a check valve connected between the outlet of the closed container and the mechanism to prevent coolant from flowing there between.

2. The apparatus as recited in claim 1 wherein the end of the inlet tube is tapered at an acute angle with respect to an longitudinal axis of the inlet tube.

3. The apparatus as recited in claim 1 further comprising a resilient member for providing a fluid tight seal between the inlet tube and the hose.

4. The apparatus as recited in claim 1 further comprising a resilient annular member extending around the inlet tube to provide a fluid tight seal between the inlet tube and the hose; and a ring releasably attached about the inlet tube and abutting the resilient annular member for selectively limiting a distance that the inlet tube may penetrate into the hose.

5. The apparatus as recited in claim 1 wherein the mechanism comprises a venturi having a fluid inlet for attachment to a source of a pressurized fluid, a fluid outlet and a suction port to which the outlet of the closed container is connected, wherein a flow of fluid from the fluid inlet to the fluid outlet creates suction at the suction port which draws coolant from the cooling system into the closed container.

6. The apparatus as recited in claim 5 further comprising a filter and a control valve connected in series to the fluid inlet of the venturi and through which the pressurized fluid flows from the source.

7. The apparatus as recited in claim 5 wherein the fluid inlet of the venturi has a first passage with a cross-sectional area that is smaller than a cross-sectional area of a second passage through the fluid outlet.

8. The apparatus as recited in claim 5 wherein the venturi comprises a body which defines the fluid inlet and the suction port and which has an aperture in communication with the fluid inlet and the suction port; and a tuning tube inserted into the aperture to form fluid outlet, a depth to which the tuning tube is inserted into the aperture being variable to vary suction created at the suction port.

9. The apparatus as recited in claim 5 further comprising a muffler connected to the venturi to reduce intensity of sound produced by fluid flowing from the fluid outlet.

10. The apparatus as recited in claim 1 further comprising a drain tube connected to the closed container; and a valve connected to the drain tube to control a flow of fluid therethrough.

11. The apparatus as recited in claim 10 wherein the drain tube is U-shaped.

12. The apparatus as recited in claim 10 wherein the valve is a check valve that allows fluid to flow only out of the closed container.

13. The apparatus as recited in claim 1 further comprising a reservoir which receives fluid from the drain tube.

14. The apparatus as recited in claim 1 further comprising a filter between the inlet tube and the closed container.

15. An apparatus for draining coolant from a cooling system of a vehicle, said apparatus comprising:

an inlet tube having a sharply pointed end for insertion through a wall of a hose of the cooling system;

a closed container having an inlet to which the inlet tube is connected, and having an outlet;

a venturi having a fluid inlet for attachment to a source of a pressurized fluid, a fluid outlet and a suction port to which the outlet of the closed container is connected, wherein a flow of fluid from the fluid inlet to the fluid outlet creates a suction at the suction port which draws coolant from the cooling system of a vehicle into the closed container; and a check valve connected between the outlet of the closed container and the suction port of the venturi to prevent the coolant from flowing therebetween.

16. The apparatus as recited in claim 15 further comprising a muffler connected to the venturi to reduce intensity of sound produced by fluid flowing from the fluid outlet.

17. The apparatus as recited in claim 15 further comprising a resilient annular member extending around the inlet tube to provide a fluid tight seal between the inlet tube and the hose; and a ring releasably attached about the inlet tube and abutting the resilient annular member for selectively limiting a distance that the inlet tube may penetrate into the hose.

18. The apparatus as recited in claim 15 wherein the venturi comprises a body which defines the fluid inlet and the suction port and which has an aperture in communication with the fluid inlet and the suction port; and a tuning tube inserted into the aperture to form fluid outlet, wherein a depth to which the tuning tube is inserted into the aperture being variable to vary the suction created at the suction port.

19. The apparatus as recited in claim 15 wherein the fluid inlet of the venturi has a first passage therethrough which is smaller in cross-sectional area than a cross-sectional area of a second passage through the fluid outlet.

20. An apparatus for draining coolant from a cooling system of a vehicle, said apparatus comprising:

a coupling for connection to the cooling system to receive the coolant therefrom;

a closed container having an inlet to which the coupling is connected, and having an outlet;

a mechanism coupled to the outlet to create a partial vacuum in the closed container, thereby drawing the coolant from the cooling system into the closed container;

a drain tube connected to the closed container;

a check valve connected between the outlet of the closed container and the mechanism to prevent coolant from flowing there between; and a reservoir which fluid flowing through the drain tube.

21. The apparatus as recited in claim 20 wherein the coupling comprises an inlet tube having a sharply pointed end for insertion through a wall of the cooling system.

22. The apparatus as recited in claim 20 wherein the mechanism comprises a venturi having a fluid inlet for attachment to a source of a pressurized fluid, a fluid outlet and a suction port to which the outlet of the closed container is connected, wherein a flow of fluid from the fluid inlet to the fluid outlet creates a suction at the suction port which draws coolant from the cooling system of a vehicle into the closed container.

23. The apparatus as recited in claim 22 wherein the venturi comprises a body which defines the fluid inlet and the suction port and which has an aperture in communication with the fluid inlet and the suction port; and a tuning tube inserted into the aperture to form fluid outlet, a depth to which the tuning tube is inserted into the aperture being variable to vary the suction created at the suction port.

24. The apparatus as recited in claim 22 wherein the fluid inlet of the venturi has a first passage therethrough which is smaller in cross-sectional area than a cross-sectional area of a second passage through the fluid outlet.

25. An apparatus for draining fluid from a fluid system of a motor vehicle, said apparatus comprising:

a coupling for connection to the fluid system to receive the fluid therefrom;

a closed container having an inlet to which the coupling is connected, and having an outlet;

a venturi having a body with an air inlet for attachment to a source of compressed air, a suction port to which the outlet of the closed container is connected, and an aperture in communication with the air inlet and the suction port, the venturi including a tuning tube inserted into the aperture to form an air outlet, a depth to which the tuning tube is inserted into the aperture being variable to vary the suction created at the suction port, wherein a flow of compressed air from the air inlet to the air outlet creates a suction at the suction port which draws fluid from the fluid system of a vehicle into the closed container; and a check valve connected between the suction port and the outlet of the closed container to prevent the fluid of the motor vehicle from flowing out of the closed container.

26. The apparatus recited in claim 25 further comprising a filter through which the fluid entering the closed container flows.

* * * * *